(12) United States Patent
Handfest

(10) Patent No.: US 11,584,001 B2
(45) Date of Patent: Feb. 21, 2023

(54) BEARING ASSEMBLY

(71) Applicant: KUKA Deutschland GmbH, Augsburg (DE)

(72) Inventor: Alexander Handfest, Hollenbach (DE)

(73) Assignee: KUKA Deutschland GmbH, Augsburg (DE)

( * ) Notice: Subject to any disclaimer, the term of this patent is extended or adjusted under 35 U.S.C. 154(b) by 59 days.

(21) Appl. No.: 17/283,086

(22) PCT Filed: Oct. 15, 2019

(86) PCT No.: PCT/EP2019/077853
§ 371 (c)(1),
(2) Date: Apr. 6, 2021

(87) PCT Pub. No.: WO2020/083700
PCT Pub. Date: Apr. 30, 2020

(65) Prior Publication Data
US 2021/0339384 A1 Nov. 4, 2021

(30) Foreign Application Priority Data
Oct. 26, 2018 (DE) .................. 10 2018 126 852.1

(51) Int. Cl.
*B25J 9/10* (2006.01)
*F16C 35/077* (2006.01)
*F16C 19/38* (2006.01)

(52) U.S. Cl.
CPC ............... *B25J 9/108* (2013.01); *F16C 19/38* (2013.01); *F16C 35/077* (2013.01); *F16C 2322/59* (2013.01)

(58) Field of Classification Search
CPC .... F16C 13/02; F16C 13/022; F16C 33/7886; F16C 35/067; F16C 35/077; F16C 2322/59; B25J 9/108
See application file for complete search history.

(56) References Cited

U.S. PATENT DOCUMENTS 1,594,534 A * 8/1926 Fayette ................ F16H 1/14
74/400
2,505,215 A 4/1950 Siegerist
(Continued)

FOREIGN PATENT DOCUMENTS

AT 143908 B 12/1935
DE 1726080 U 7/1956
(Continued)

OTHER PUBLICATIONS

European Patent Office; Search Report in related International Patent Application No. PCT/EP2019/077853 dated Jan. 3, 2020; 3 pages.
(Continued)

*Primary Examiner* — James Pilkington
(74) *Attorney, Agent, or Firm* — Dorton & Willis, LLP

(57) ABSTRACT

A bearing assembly includes a bearing flange and a flange receptacle having a longitudinal axis, which comprise a mutual axial stop and a fixing for securing the mutual stop position. The fixing is designed as a wedge-type clamp which can be actuated transversely, in particular radially, to the longitudinal axis. The wedge-type clamp clamps the bearing flange and the flange receptacle axially into the mutual stop position. The bearing assembly may be, for example, provided for a robot and its rotary body.

14 Claims, 2 Drawing Sheets

(56) References Cited

U.S. PATENT DOCUMENTS

| | | | | |
|---|---|---|---|---|
| 2,511,675 | A | | 6/1950 | Monpain |
| 2,556,368 | A | | 6/1951 | Hegeman |
| 3,734,583 | A | * | 5/1973 | Hosnedl ................ F16C 35/077 384/512 |
| 6,299,394 | B1 | | 10/2001 | Stojanovski |
| 8,961,028 | B2 | * | 2/2015 | Beck ..................... F16C 33/586 384/585 |
| 10,384,870 | B2 | * | 8/2019 | Geiger ................. B65G 1/1375 |
| 2016/0223039 | A1 | | 8/2016 | Dessaint Jean |

FOREIGN PATENT DOCUMENTS

| | | | |
|---|---|---|---|
| DE | 1006318 | A | 4/1957 |
| DE | 1066388 | A | 10/1959 |
| DE | 2614904 | * | 10/1977 |
| DE | 102007029743 | A1 | 1/2009 |
| DE | 202013006387 | U1 | 8/2013 |
| DE | 102015200660 | A1 | 2/2016 |
| DE | 102016104376 | A1 | 9/2017 |
| DE | 102016107866 | A1 | 11/2017 |
| GB | 2163523 | A | 2/1986 |
| WO | 8901101 | A1 | 2/1989 |

OTHER PUBLICATIONS

German Patent Office; Search Report in related German Patent Application No. 10 2018 126 852.1 dated Feb. 15, 2019; 7 pages.
Chinese Patent Office; Search Report in related Chinese Patent Application No. 2019800705291 dated Aug. 22, 2022; 9 pages.

* cited by examiner

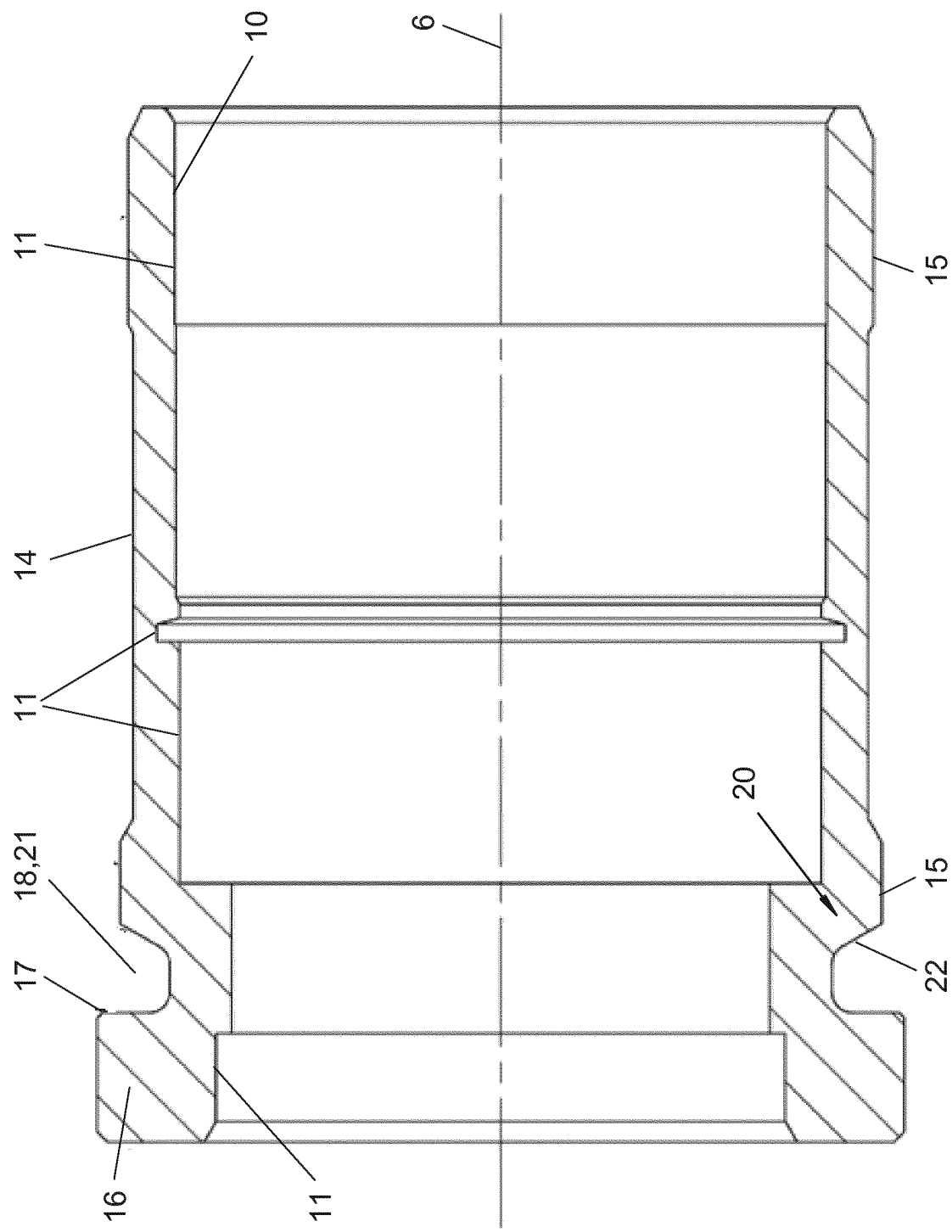

BEARING ASSEMBLY

CROSS-REFERENCE TO RELATED APPLICATIONS

This application is a national phase application under 35 U.S.C. § 371 of International Patent Application No. PCT/EP2019/077853, filed Oct. 15, 2019, which claims the benefit of priority to German Patent Application No. DE 10 2018 126 852.1, filed Oct. 26, 2018, the disclosures of which are incorporated by reference herein in their entirety.

TECHNICAL FIELD

The invention relates to a bearing assembly.

BACKGROUND

Bearing assemblies are known from practice, and generally comprise a bearing flange and a flange receptacle which have a common longitudinal axis, a mutual axial stop, and a fixing for securing the mutual stop position. The bearing flange has a radial collar or pipe flange which rests against an end face of the flange receptacle and is fixed there by screws.

SUMMARY

It is an object of the present invention to provide an improved bearing assembly.

This object is achieved with a bearing assembly as shown and described herein.

The fixing of the disclosed bearing assembly is designed as a wedge-type clamping means which can be actuated transversely, in particular radially, to the longitudinal axis and thereby clamps the bearing flange and the flange receptacle axially into the mutual stop position.

The wedge-type clamping means can be arranged to be locally separated from the axial stop. As required, it can be activated for fixing the connection of bearing flange and flange receptacle and deactivated for releasing the connection and also for disassembly.

The disclosed bearing assembly has the advantage that it requires less manufacturing and assembly effort and in addition saves space. The bearing flange can be simplified and optimized for its main function of receiving and supporting the bearing, seal, etc. of a rotary body. For this purpose, the bearing flange can be designed in particular as an inexpensive turned part or cast part.

Furthermore, the contact surface required for the axial stop can be substantially reduced. The space previously required for the screws can be eliminated. The bearing flange and the flange receptacle can thereby be made significantly smaller in diameter or cross-section.

The bearing flange and the flange receptacle can be inserted into one another. They can be designed as rotationally symmetrical parts having a circular cross-section and a common central longitudinal axis. Alternatively, they may be insertable in another way and may have a different, for example a prismatic, cross-section. The mutual position of bearing flange and flange receptacle in the transverse direction, in particular in the radial direction, can be achieved by means of fitting surfaces. These can be selected with a greater overlap, in particular as a transition or interference fit. The operating forces can thereby be absorbed at least partially.

The disclosed bearing assembly also has the advantage that the fixing or the wedge-type clamping means is better accessible from the outside. Special advantages result in connection with a robot structure on which the bearing assembly is provided. The bearing receptacle can be a separate part or, for example, a casing-like part of the robot structure or another device.

The fixing designed as a wedge-type clamping means also has the advantage that it allows a reliable securing of the mutual stop position of the bearing flange and the flange receptacle. High axial clamping and pressing forces can be developed in this case. These forces allow the remaining operating forces to be absorbed and secure the axial position of the bearing flange in the flange receptacle.

The wedge-type clamping means can be designed in different ways. The circumferential arrangement between the bearing flange and the flange receptacle has the advantage of particularly good accessibility and direct force transmission.

The clamping elements which can engage in one another in a form-fitting manner and are oriented transversely to said longitudinal axis can be designed in different ways. They comprise a wedge face with which the adjustment movement of the one clamping element directed transversely to the longitudinal axis can be converted into an axial adjusting and clamping movement for said mutual stop position with little effort and with the development of high forces. The connection is also very reliable operationally due to the transverse orientation and the mutual positive engagement.

The design of the clamping elements as a recess and as a projection engaging therein is particularly favorable for the form-fitting effect. Said wedge face can be formed in a particularly simple manner, in particular by an oblique recess wall. The number and arrangement of the projections and recesses may vary.

A design of the recessed clamping element as a circumferential and preferably annular groove on the bearing flange is particularly advantageous, one or more other projecting clamping elements being able to engage in the groove. These clamping elements can be received on the bearing flange and can in particular be designed as adjustable radial clamping pins. A design as a threaded pin that can be screwed from the outside through a threaded hole into the jacket of the flange receptacle is advantageous. Said assignment of recessed and projecting clamping elements to the bearing flange and flange receptacle can also be reversed.

The bearing flange and the flange receptacle can each be designed as a sleeve or tube and inserted into one another in said manner, wherein they can comprise small stop surfaces for forming the mutual stop. The bearing flange can comprise one or more receiving means for a bearing of a rotary body, for a seal, or the like. The flange receptacle can be designed, for example, as a casing-like part of a device, in particular of an industrial robot.

The advantages of the disclosed bearing receptacle also benefit a device, in particular an industrial robot, which is equipped with at least one such bearing assembly.

A bearing assembly in accordance with the present disclosure is illustrated by way of example and schematically in the drawings.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 2 depicts the bearing flange in an individual representation and in an axial longitudinal section.

DETAILED DESCRIPTION

Figure 1:
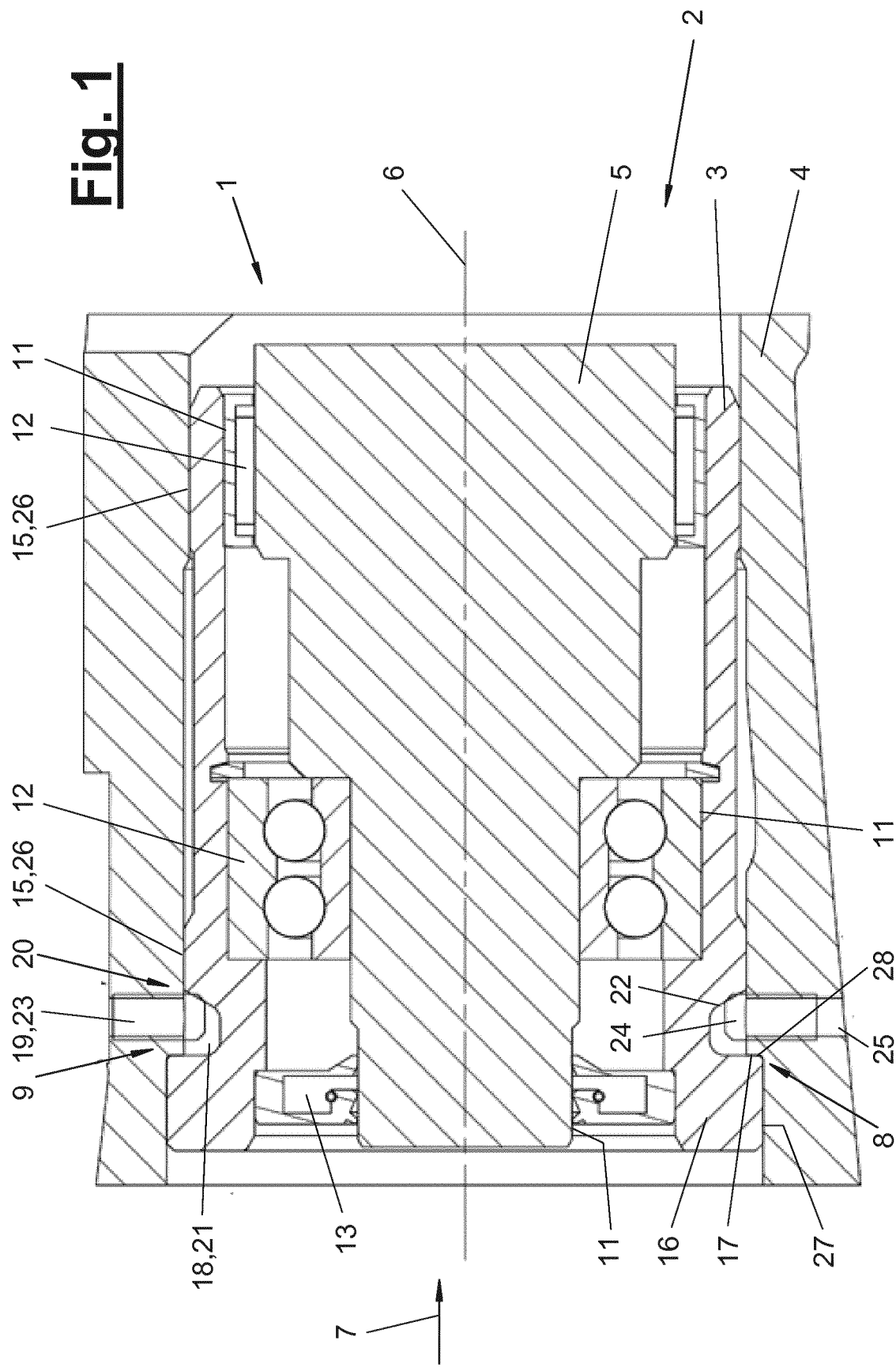
FIG. 1 depicts a bearing assembly comprising a bearing flange and a bearing receptacle as well as further parts in an axial longitudinal section.

The invention relates to a bearing assembly (1) comprising a bearing flange (3) and a flange receptacle (4). The invention furthermore relates to a device (2), in particular an industrial robot, which is equipped with such a bearing assembly (1). The invention furthermore relates to a method for producing or forming such a bearing assembly (1).

The bearing assembly (1) shown in the central longitudinal section of FIG. 1 comprises a bearing flange (3) and a flange receptacle (4), which may have a common and preferably concentric longitudinal axis (6). The bearing flange (3) and the flange receptacle (4) have a mutual axial stop (8) on which they can be mutually positioned in the direction of the longitudinal axis (6). The bearing assembly (1) also comprises a fixing for securing this mutual stop position of the bearing flange (3) and the flange receptacle (4).

The bearing flange (3) and the flange receptacle (4) can be plugged together in an axial insertion direction or installation direction (7). In this case, the bearing flange (3) can be received and fixed in a form-fitting manner in the flange receptacle (4).

The bearing flange (3) and the flange receptacle (4) are each designed as a sleeve or tube. They have inner and outer surface contours adapted to one another on the circumferential contact region. They also have a mutually adapted cross-section. In the exemplary embodiment shown, the cross-sectional shape may be circular, for example. Alternatively, it may be prismatic or oval or designed differently.

For forming the mutual axial stop (8), the bearing flange (3) comprises, at its rear end face when viewed in the installation direction (7), a collar (16) projecting transversely, in particular radially, to the axis (6) and comprising a stop face (17) facing in the installation direction (7) at the end face. The collar (16) can be formed on the sleeve. It can be designed to be annular and circumferential or interrupted circumferentially.

At the front end of the inner jacket, the flange receptacle (4) comprises a recess (27) comprising a stop face (28) facing opposite the installation direction (7). During insertion, the collar (16) dips into the recess (27), the stop faces (17, 28) directed against one another coming to rest. A small, transversely directed or radial overlap of, for example, cross-turned stop faces (17, 28) suffices for the axial stop (8). The recess (27) can be produced cost-effectively as a countersink on the inner sleeve jacket of the flange receptacle (4).

The fixing is designed as a wedge-type clamping means (9). It can be arranged behind or in front of the axial stop (8) when viewed in the installation direction (7). The wedge-type clamping means (9) can be actuated transversely, in particular radially, to the longitudinal axis. In this case, the wedge-type clamping means (9) can clamp the bearing flange (3) and the flange receptacle (4) axially into the mutual stop position on the axial stop (8) by virtue of its wedge effect. The wedge-type clamping means (9) is arranged circumferentially between the bearing flange (3) and the flange receptacle (4). It is oriented transversely, in particular radially, to the longitudinal axis (6).

The wedge-type clamping means (9) comprises clamping elements (18, 19) which are arranged alternately on the bearing flange (3) and on the flange receptacle (4), are oriented transversely, in particular radially, to the longitudinal axis (6), can engage in one another in a form-fitting manner, and have a wedge face (20). The positive wedge engagement can be released as required, e.g., for disassembly of the bearing flange (3).

For forming the positive engagement, the clamping elements (18, 19) are designed as a recess and as a projection. A wedge face (20) can be arranged on one or both clamping elements (18, 19), in particular on the recess.

In the exemplary embodiment shown, a recessed clamping element (18) is arranged on the bearing flange (3). It is designed, for example, as a circumferential and preferably annular groove (21). The groove (21) is located on the outer surface (14) of the bearing flange (3). The annular groove may have a closed circumferential ring shape, in particular a circular ring shape.

The recess (18), in particular the groove (21), is arranged, for example, behind the axial stop (8) when viewed in the installation direction (7). The recess (18) can be arranged in the immediate vicinity of the axial stop (8) or of the stop face (16) or alternatively be at a distance in the axial direction.

One or more projecting clamping elements (19) are arranged, for example, on the flange receptacle (4). In the exemplary embodiment shown, several projecting clamping elements (19) are arranged to be distributed in the circumferential direction. They can in each case be designed, for example, as a radial clamping pin (23), in particular as a threaded pin. A threaded pin can be received on the jacket of the flange receptacle (4) through a prepared threaded hole (23). By means of a screw movement, the threaded pin can be inserted from the outside through the outer surface into the recess, in particular the groove (21), and can also be unscrewed again as required.

In the exemplary embodiment shown, there are at least two diametrically opposite clamping elements (19) or clamping pins (23) which engage in the recess (18) or groove (21) at different, in particular opposite, locations.

The recess (18), in particular the groove (21), has a larger axial width in the installation direction (7) than the projection (19), in particular the clamping pin (23). In the embodiment shown, the recess (18), in particular the groove (21), comprises on the side facing away from the stop (8) an oblique side wall (22) which forms a wedge face (20). The oblique position and orientation is in relation to the axis (6). The oblique side wall (22) faces toward the stop (8).

The projection (19), in particular the clamping pin (23), can comprise a front-end head or a tip (24) with a conical shape. A wedge face (20) can likewise be formed by the cone.

When the projection (19), in particular the clamping pin (23), is actuated transversely to the axis (6), its head (24) strikes the oblique side wall (22). The transversely or radially directed adjustment force is deflected into an axial clamping force which points in the installation direction (7) and by means of which the stop faces (17, 28) are pressed against one another.

In the arrangement shown, the bearing flange (3) in the stop position is pulled on the flange receptacle (4). In a reverse arrangement of the wedge-type clamping means (9) in front of the stop when viewed in the installation direction (7), the bearing flange (3) is pushed.

On their circumference, the bearing flange (3) and the flange receptacle (4) have mutually interacting pairs of guide faces (15, 26). The latter can each be designed as, for example, annular fitting faces. A guide face (15) on the outer surface (14) of the bearing flange (3) can be arranged behind the wedge-type clamping means (9) when viewed in the installation direction (7), in particular directly axially connected to the recess (18) or groove (21). In this case, the recess (18) or groove (21) is located between the guide face or fitting face (15) and the axial stop (8).

The guide face or fitting face (15) can be designed as a circumferential collar which projects slightly beyond the outer surface (14). The transversely directed or radial projection is smaller than in the collar (16) and the stop face (17). The guide face or fitting face (26) arranged on the flange receptacle (4) can likewise be offset in the transverse direction or radial direction.

One or more further pairs of guide faces or fitting faces (15, 26) can be arranged at a distance downstream when viewed in the installation direction (7). Such a further pair is arranged, for example, on the other end face of the bearing flange (3).

As FIGS. 1 and 2 illustrate, on the inner surface (10) the bearing flange (3) has one or more receiving means (11) for a bearing (12) of a rotary body (5), for a retaining ring, for a seal (13), or the like. The inner surface (10) can be stepped, whereby a rolling bearing, in particular a roller bearing, arranged in axial proximity to the stop (8) can be clamped between the bearing flange (3) and the rotary body (5) and additionally secured with the retaining ring. A further bearing (12), which is designed, for example, as a needle bearing, can be arranged at the other end face of the bearing flange (3). The seal (13) is arranged on the front end of the bearing flange (3) and seals off the free space between the rotary body (5) and the inner jacket (10).

The flange receptacle (4) can be designed as a casing-like part of a device (2), for example. The device (2) can be, for example, an industrial robot. In this case, the flange receptacle (4) can be designed as a hollow part of a casing for a robot axis.

Modifications of the embodiments shown and described are possible in various ways.

A recessed clamping element (18) can be formed, for example, by several punctiform or linear recesses arranged to be distributed in the circumferential direction on the outer surface (14) of the bearing flange (3). This can be, for example, a countersunk hole having an oblique side wall or flank.

A projecting clamping element (19) can be designed, for example, as a curved clamping jaw which is guided slidably within a jaw receptacle oriented transversely to the axis (6) and is acted upon by a suitable adjustment device and locked in the clamping position. At the front end, the clamping jaw can comprise an oblique face or wedge face, which interacts with a corresponding oblique mating face on the recess (18), in particular an annularly curved groove (21).

In a modification, the clamping element (18) designed as a recess can be assigned to the bearing flange (3) and the clamping element (19) designed as a projection can be assigned to the flange receptacle (4). It is also possible to move a recessed clamping element (18) relative to a projecting clamping element (19).

The plugging-in assignment of the bearing flange (3) and the flange receptacle (4) can be reversed, wherein the bearing flange (3) is arranged on the outside.

Aside from the rectangular orientation shown, the aforementioned orientation of the clamping elements (18, 19) transverse to the axis (6) also includes oblique orientations. The wedge-face design and the wedge-clamping effect change accordingly.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Bearing assembly
2 Device, industrial robot
3 Bearing flange
4 Flange receptacle
5 Rotary body, shaft
6 Axis
7 Installation direction
8 Axial stop
9 Wedge-type clamping means
10 Inner surface
11 Receiving means
12 Bearing
13 Seal
14 Outer surface
15 Guide face, fitting face
16 Collar
17 Stop face
18 Clamping element, recess
19 Clamping element, projection
20 Wedge face
21 Groove, annular groove
22 Oblique side wall
23 Clamping pin, threaded pin
24 Head, tip
25 Pin receptacle, threaded hole
26 Guide face, fitting face
27 Recess
28 Stop face

What is claimed is:

1. A bearing assembly, comprising:
a flange receptacle having a central, longitudinal axis;
a bearing flange received within the flange receptacle along an insertion direction aligned with the longitudinal axis, to abut a stop position between the flange receptacle and the bearing flange; and
a fixing structure for securing the bearing flange within the flange receptacle at the stop position;
wherein the fixing structure is configured as a clamping means which can be actuated transversely to the longitudinal axis, the clamping means clamping the bearing flange and the flange receptacle axially into the stop position;
wherein the clamping means comprises at least one first clamping element configured as a recess and at least one second clamping element configured as a projection;
wherein the at least one first clamping element and the at least one second element are:

alternatingly arranged on the bearing flange and the flange receptacle;
oriented transversely to the longitudinal axis;
are engageable with one another in a form-fitting manner; and
have respective wedge faces; and
wherein the recess comprises a circumferential groove, and the at least one projection comprises at least one clamping pin.

2. The bearing assembly of claim 1, wherein the second clamping element is actuable in a direction radial to the longitudinal axis.

3. The bearing assembly of claim 1, wherein the clamping elements are arranged circumferentially between the bearing flange and the flange receptacle.

4. The bearing assembly of claim 1, wherein the clamping elements are oriented radially to the longitudinal axis.

5. The bearing assembly of claim 1, wherein the at least one first clamping element is arranged on the bearing flange, and the at least one second clamping element is arranged on the flange receptacle.

6. The bearing assembly of claim 1, wherein at least one of:
the circumferential groove is an annular groove;
the at least one clamping pin radially extends; or
the at least one clamping pin comprises a threaded pin.

7. The bearing assembly of claim 1, wherein the recess has a larger axial width than the projection and comprises an oblique side wall that faces toward the stop position and forms a wedge face.

8. The bearing assembly of claim 1, wherein the bearing flange and the flange receptacle are tubular structures and each comprises a respective stop face defining the stop position.

9. The bearing assembly of claim 1 wherein:
the bearing flange and the flange receptacle comprise circumferential, mutually interacting guide faces; and
the bearing flange comprises one or more receiving means for receiving a bearing of a rotary body or a seal.

10. The bearing assembly of claim 9, wherein the mutually interacting guide faces are mating faces.

11. The bearing assembly of claim 1, wherein a casing of a device in which the bearing assembly is used comprises the flange receptacle.

12. The bearing assembly of claim 11, wherein the device is an industrial robot.

13. A device, comprising:
a housing;
a bearing assembly according to claim 1; and
a rotary body mounted within the bearing flange;
wherein the housing defines the flange receptacle.

14. The device of claim 13, wherein the device is configured as an industrial robot.

* * * * *